(12) United States Patent
Sveum

(10) Patent No.: US 8,544,130 B2
(45) Date of Patent: Oct. 1, 2013

(54) CURVED TRANSITION PLATES FOR PIVOTAL DOCK LEVELER DECKS

(75) Inventor: Matthew Sveum, Wauwatosa, WI (US)

(73) Assignee: Rite-Hite Holding Corporation, Milwaukee, WI (US)

( * ) Notice: Subject to any disclaimer, the term of this patent is extended or adjusted under 35 U.S.C. 154(b) by 0 days.

(21) Appl. No.: 12/836,329

(22) Filed: Jul. 14, 2010

(65) Prior Publication Data

US 2012/0011664 A1   Jan. 19, 2012

(51) Int. Cl.
*E01D 1/00* (2006.01)

(52) U.S. Cl.
USPC ............................. 14/71.1; 14/69.5; 14/71.3

(58) Field of Classification Search
USPC ........................ 14/69.5–71.7; 16/312, 355
See application file for complete search history.

(56) References Cited

U.S. PATENT DOCUMENTS

| | | | |
|---|---|---|---|
| 1,544,139 | A | 6/1925 | Duclos |
| 1,993,261 | A | 3/1935 | Colgate |
| 2,592,919 | A | 4/1952 | Loomis et al. |
| 2,751,615 | A | 6/1956 | Kelley |
| 2,843,865 | A * | 7/1958 | Loomis .................. 14/71.3 |
| 2,881,457 | A | 4/1959 | Rodgers |
| 2,972,762 | A | 2/1961 | McConica |
| 2,979,007 | A | 4/1961 | Kummerman |
| 2,994,894 | A | 8/1961 | Loomis et al. |
| 3,137,876 | A * | 6/1964 | Loomis .................. 14/71.3 |
| 3,235,895 | A | 2/1966 | Wallace et al. |
| 3,249,956 | A | 5/1966 | Zajac et al. |
| 3,308,497 | A | 3/1967 | Lambert |
| 3,314,094 | A * | 4/1967 | Moyer et al. .................. 14/71.7 |
| 3,424,323 | A | 1/1969 | Barnaby |
| 3,587,126 | A | 6/1971 | Potter et al. |
| 3,840,930 | A | 10/1974 | Wanddell |

(Continued)

FOREIGN PATENT DOCUMENTS

| | | |
|---|---|---|
| DE | 2852888 | 8/1980 |
| DE | 3018932 | 11/1981 |

(Continued)

OTHER PUBLICATIONS

European Patent Office, "European Search Report," issued in connection with European application serial No. 04029995.0, issued Mar. 18, 2005, 4 pages.

(Continued)

*Primary Examiner* — Matthew D Troutman
(74) *Attorney, Agent, or Firm* — Hanley, Flight & Zimmerman, LLC.

(57) ABSTRACT

Example dock levelers at a truck-loading platform include a stationary curved transition plate extending between a rear edge of the leveler's pivotal deck and a rear edge of a pit at which the leveler is installed. The transition plate has a curved portion that extends underneath the deck's rear edge. The plate provides a smooth transition for forklifts traveling between the platform and the deck, thus reducing and/or minimizing the jarring of the forklift and its driver. To prevent debris and obstructions from getting trapped within the deck's rear hinge, the rear edge of the deck rises up and over the transition plate as the deck pivots upward, thereby providing a self-cleaning effect. With the rear edge of an inclined deck being above the transition plate, water runoff from the deck drains onto the transition plate rather than through the hinge gap to a generally inaccessible area underneath the deck.

24 Claims, 6 Drawing Sheets

(56) References Cited

U.S. PATENT DOCUMENTS

| | | | |
|---|---|---|---|
| 3,872,948 A | 3/1975 | Richards | |
| 4,020,517 A | 5/1977 | Waddell | |
| 4,065,824 A | 1/1978 | Ellis et al. | |
| 4,142,640 A | 3/1979 | Kummerman | |
| 4,155,468 A | 5/1979 | Royce | |
| 4,169,296 A | 10/1979 | Wipkink et al. | |
| 4,257,137 A | 3/1981 | Hipp et al. | |
| 4,354,771 A | 10/1982 | Dickinson | |
| 4,455,703 A | 6/1984 | Fromme et al. | |
| 4,682,382 A * | 7/1987 | Bennett | 14/71.3 |
| 4,718,136 A | 1/1988 | Fisher et al. | |
| 4,865,507 A | 9/1989 | Trickle | |
| 5,097,557 A | 3/1992 | Salman et al. | |
| 5,214,818 A * | 6/1993 | Cook | 14/71.1 |
| 5,343,583 A | 9/1994 | Cook | |
| 5,475,888 A * | 12/1995 | Massey | 14/69.5 |
| 5,522,208 A | 6/1996 | Wattron | |
| 5,781,953 A | 7/1998 | Winter | |
| 5,815,871 A | 10/1998 | Borchardt | |
| 6,112,353 A | 9/2000 | Winter | |
| 6,163,913 A * | 12/2000 | DiSieno et al. | 14/71.3 |
| 6,360,393 B1 | 3/2002 | Fritz | |
| 6,370,719 B1 | 4/2002 | Alexander | |
| 6,460,212 B2 | 10/2002 | Massey et al. | |
| 6,487,741 B2 | 12/2002 | Alexander | |
| 6,634,049 B2 | 10/2003 | Hahn et al. | |
| 6,654,976 B2 | 12/2003 | Digmann et al. | |
| 7,079,081 B2 | 7/2006 | Parsche et al. | |
| 7,216,391 B2 | 5/2007 | Muhl et al. | |
| 7,363,670 B2 | 4/2008 | Mitchell et al. | |
| 7,681,271 B2 | 3/2010 | Muhl et al. | |
| 2005/0132512 A1 | 6/2005 | Muhl et al. | |
| 2005/0172425 A1* | 8/2005 | Hahn et al. | 14/71.1 |
| 2007/0294845 A1 | 12/2007 | Muhl et al. | |
| 2008/0313826 A1* | 12/2008 | Kloppenburg et al. | 14/71.1 |

FOREIGN PATENT DOCUMENTS

| | | |
|---|---|---|
| DE | 3407496 A1 * | 9/1984 |
| DE | 3937373 A1 * | 5/1990 |
| DE | 29618180 | 4/1997 |
| EP | 0183126 | 11/1985 |
| EP | 0601176 | 12/1996 |
| GB | 1048557 | 11/1966 |
| GB | 1049759 | 11/1966 |
| GB | 2168674 A * | 6/1986 |
| GB | 2259903 A * | 3/1993 |

OTHER PUBLICATIONS

Rite-Hite Corporation, "Installation-Operation-Service-Parts for EOD 400 Series Mechanical Dock Leveler," Owners Manual, published Mar. 1981, 3 pages.

Rite-Hite Corporation, "Parts Manual for Hinged Lip Dock Leveler Model HL56," published 1965, 4 pages.

United States Patent and Trademark Office, "Non-Final Office Action," issued in connection with U.S. Appl. No. 10/739,791, mailed Feb. 3, 2005, 19 pages.

United States Patent and Trademark Office, "Final Office Action," issued in connection with U.S. Appl. No. 10/739,791, mailed Oct. 21, 2005, 14 pages.

United States Patent and Trademark Office, "Advisory Action," issued in connection with U.S. Appl. No. 10/739,791, mailed Jan. 10, 2006, 3 pages.

United States Patent and Trademark Office, "Non-Final Office Action," issued in connection with U.S. Appl. No. 10/739,791, mailed Jun. 8, 2006, 8 pages.

United States Patent and Trademark Office, "Notice of Allowance," issued in connection with U.S. Appl. No. 10/739,791, mailed Jan. 18, 2007, 4 pages.

United States Patent and Trademark Office, "Supplemental Notice of Allowance," issued in connection with U.S. Appl. No. 10/739,791, mailed Apr. 5, 2007, 2 pages.

United States Patent and Trademark Office, "Interview Summary," issued in connection with U.S. Appl. No. 10/739,791, mailed Oct. 11, 2006, 3 pages.

European Patent Office, "Office Communication," issued in connection with European application serial No. 04029995.0, mailed Jan. 12, 2006, 4 pages.

European Patent Office, "Decision to Grant," issued in connection with European application serial No. 04029995.0, mailed Apr. 13, 2007, 1 page.

European Patent Office, "European Search Report," issued in connection with European application serial No. 07005166.9, mailed Jun. 8, 2007, 4 pages.

European Patent Office, "Office Communication," issued in connection with European application serial No. 07005166.9, mailed Jan. 21, 2008, 6 pages.

Australian Patent Office, "Examination Report," issued in connection with Australian application serial No. 2004240194, issued Oct. 27, 2009, 1 page.

Australian Patent Office, "Notice of Acceptance," issued in connection with Australian application serial No. 2004240194, issued Jan. 14, 2010, 7 pages.

Canadian Intellectual Property Office, Office Action, issued in connection with Canadian application serial No. 2,490,444, issued Jun. 16, 2011, 2 pages.

United States Patent and Trademark Office, "Office Communication," issued in connection with U.S. Appl. No. 11/691,932, mailed Jan. 28, 2010, 5 pages.

United States Patent and Trademark Office, "Notice of Allowance," issued in connection with U.S. Appl. No. 11/691,932, mailed Dec. 7, 2009, 10 pages.

United States Patent and Trademark Office, "Final Office Action," issued in connection with U.S. Appl. No. 11/691,932, mailed Aug. 10, 2009, 13 pages.

United States Patent and Trademark Office, "Non-Final Office Action," issued in connection with U.S. Appl. No. 11/691,932, mailed Dec. 2, 2008, 19 pages.

Canadian Intellectual Property Office, "Office Action," issued in connection with Canadian application serial No. 2,745,686, issued Sep. 11, 2012, 3 pages.

* cited by examiner

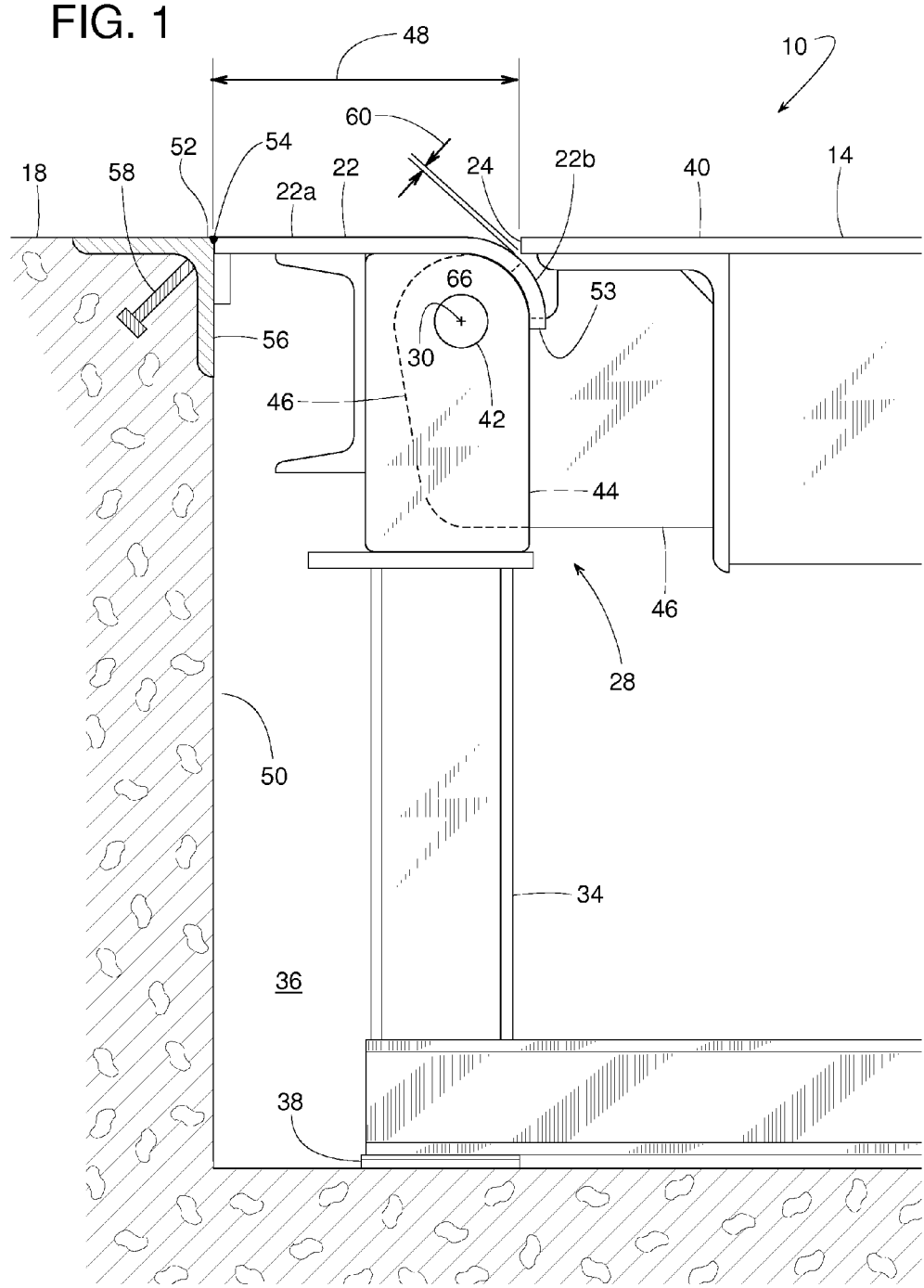

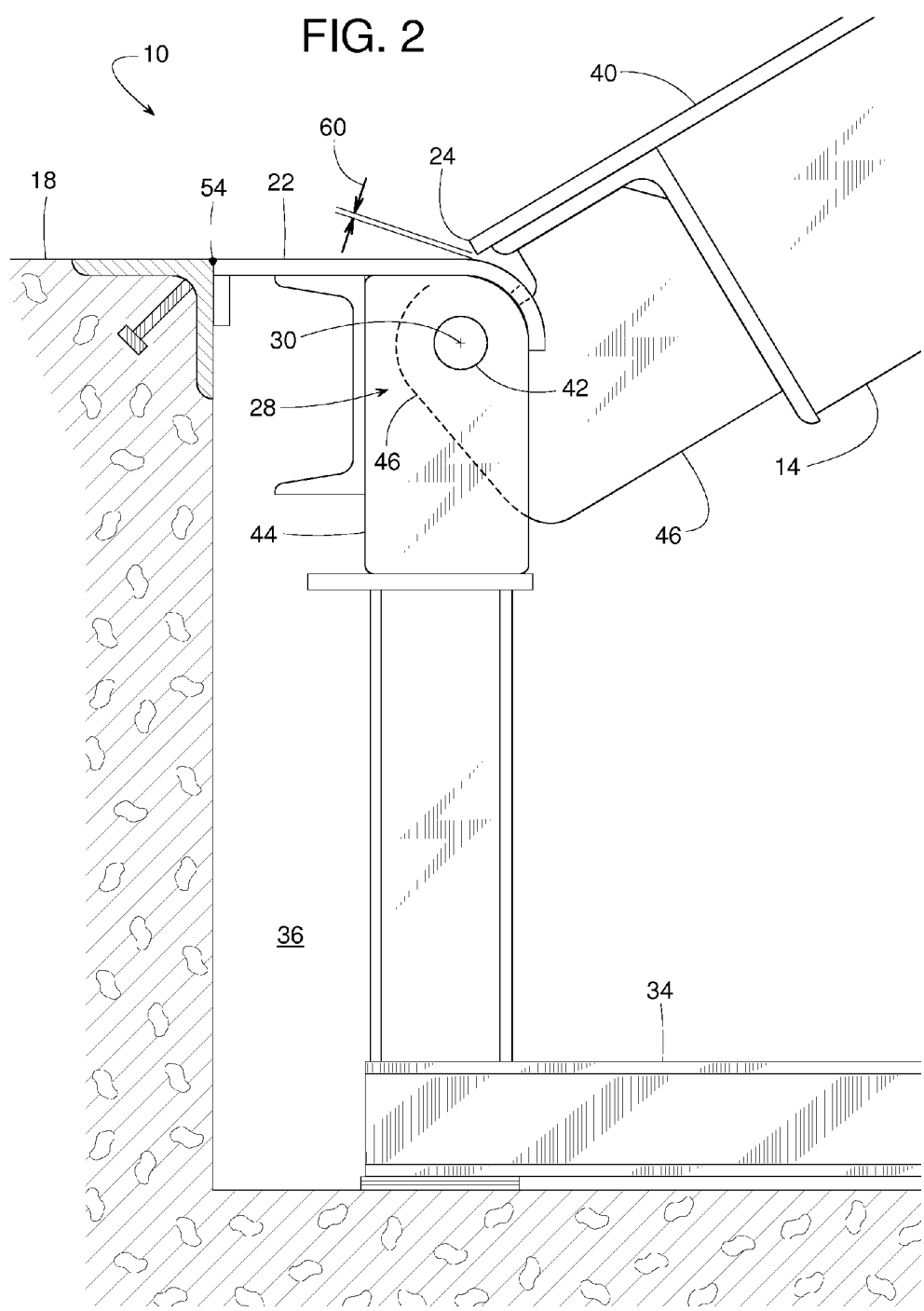

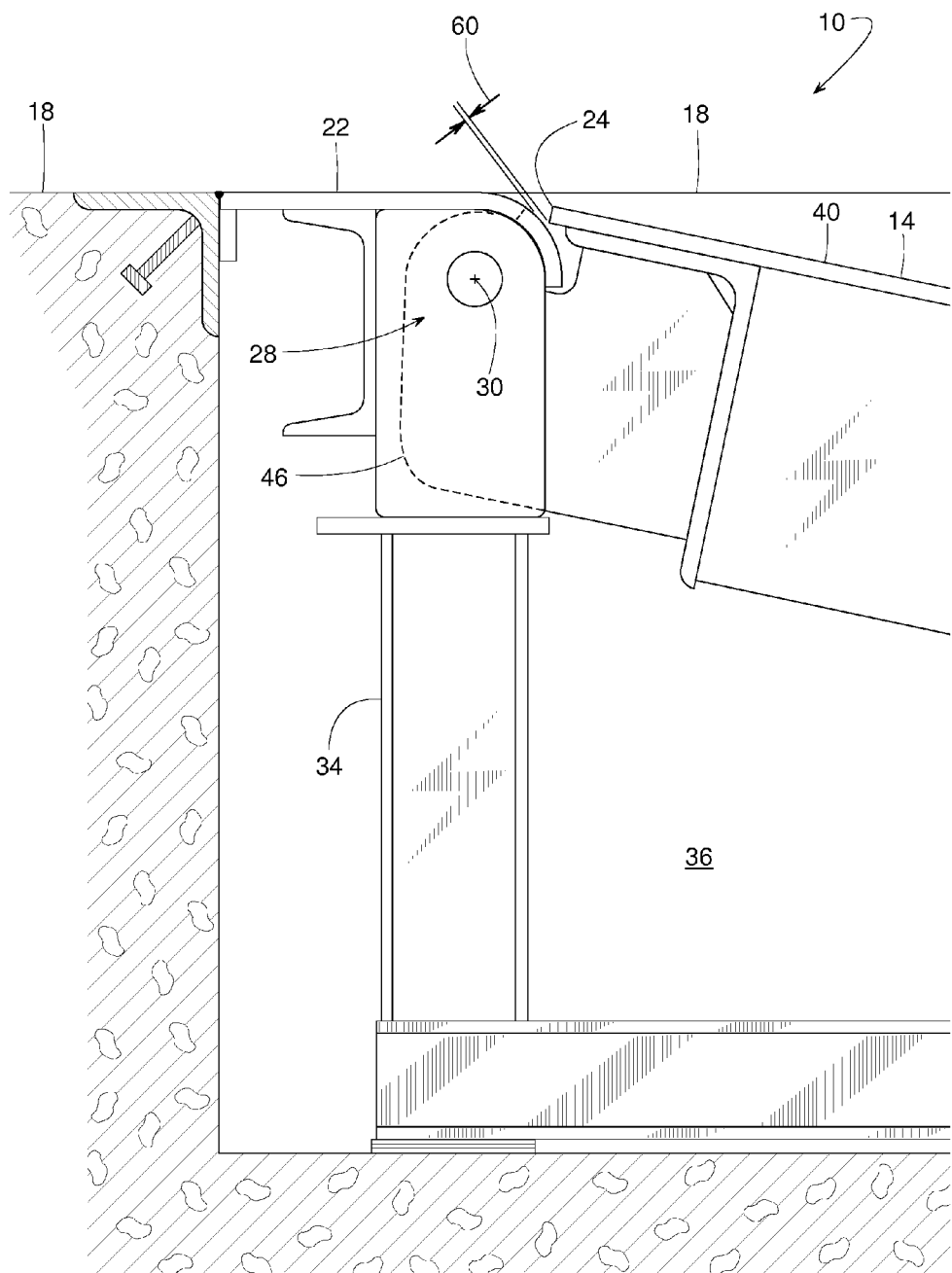

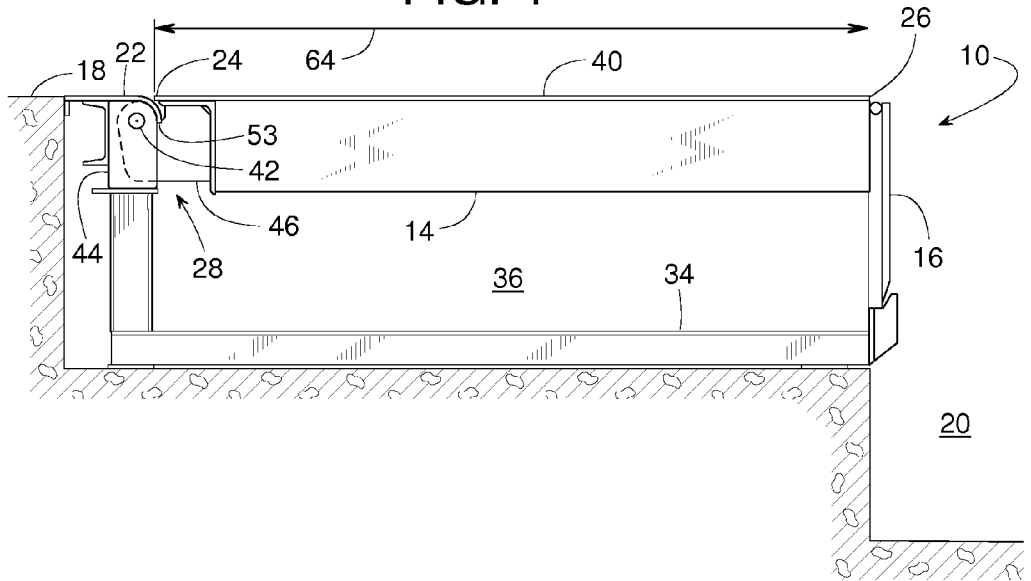
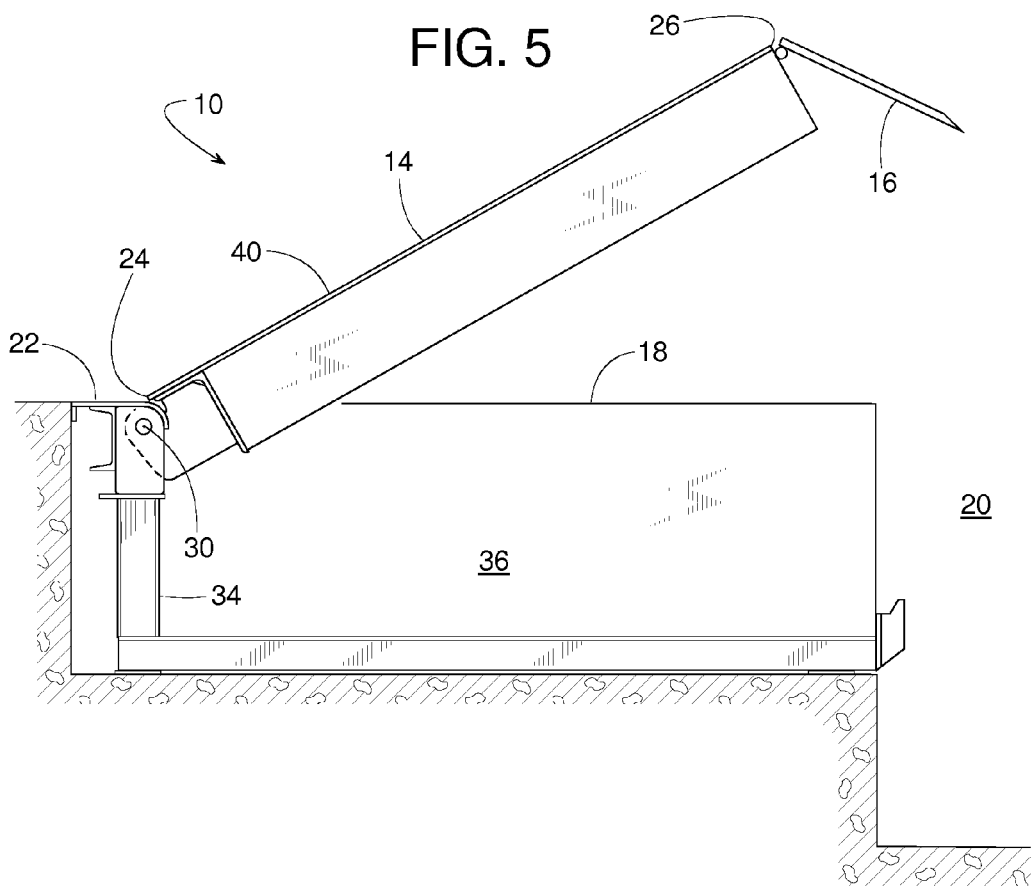

CURVED TRANSITION PLATES FOR PIVOTAL DOCK LEVELER DECKS

FIELD OF THE DISCLOSURE

This patent generally pertains to dock levelers and, more specifically, to curved transition plates for pivotal dock leveler decks.

BACKGROUND

A typical loading dock of a building includes an exterior doorway with an elevated platform for loading and unloading vehicles such as trucks and trailers. Many loading docks have a dock leveler to compensate for a height difference that may exist between the loading dock platform and an adjacent bed of a truck or trailer. A dock leveler often includes a deck that is hinged along its back edge so that the deck can pivotally adjust the height of its front edge to an elevation that generally matches the height of the rear edge of the truck or trailer bed. The deck usually has an extendible lip at its front edge that is extended to rest upon the trailer bed to form a bridge between the deck and the bed. This allows personnel and material handling equipment, such as a forklift truck, to readily move on and off the trailer during loading and unloading operations.

The hinge area at the rear edge of the deck, unfortunately, can present a surface interruption or discontinuity. As the wheels of material handling equipment roll over this area, the surface interruption can jar the moving equipment and its driver.

BRIEF DESCRIPTION OF THE DRAWINGS

FIG. 1 is a side view of an example dock leveler showing a rear portion of the deck in a cross-traffic position.

FIG. 2 is a side view similar to FIG. 1, but showing the rear portion of the deck in a raised position.

FIG. 3 is a side view similar to FIG. 1, but showing the rear portion of the deck in a lowered position.

FIG. 4 is a side view similar to FIG. 1, but showing the deck in the cross-traffic position.

FIG. 5 is a side view similar to FIG. 2, but showing the deck in the raised position and a lip of the deck partially extended.

DETAILED DESCRIPTION

Figure 6:
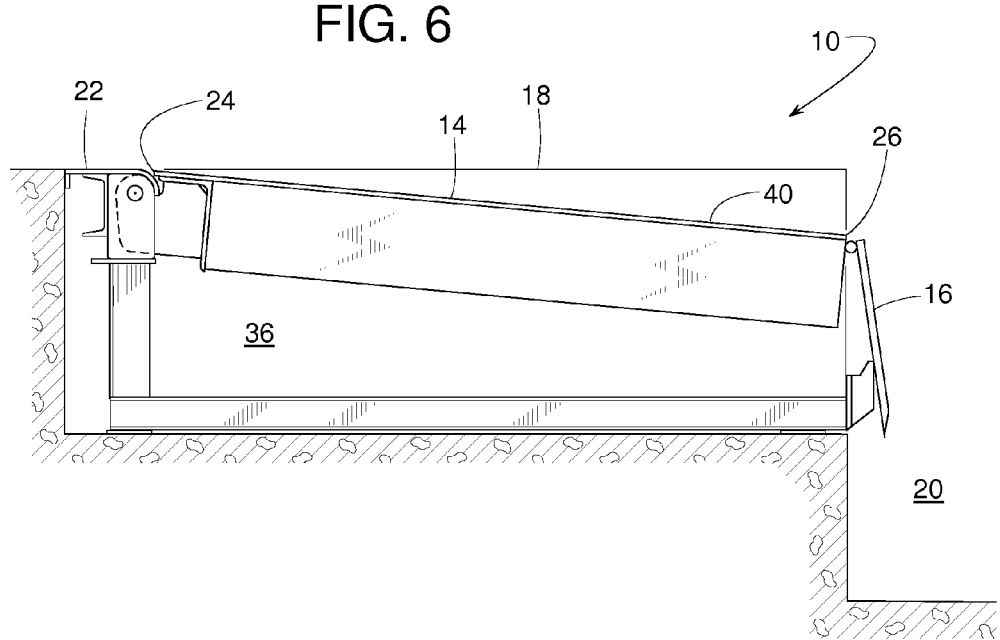
FIG. 6 is a side view similar to FIG. 3, but showing the deck in the lowered position.

FIGS. 1-8 show an example dock leveler 10 for facilitating the loading and unloading of cargo on a trailer bed 12 or some other vehicle or truck bed. Dock leveler 10 includes a pivotally adjustable deck 14 with an extendible lip 16 that together provide a path or ramp over which a forklift and other material handling vehicle can travel between vehicle bed 12 and an elevated platform 18 of a loading dock 20. A transition plate 22 provides a relatively smooth transition over which the wheels of the material handling vehicles can travel between platform 18 and a rear edge 24 of deck 14.

To adjust the height of the deck's front edge 26 to roughly align with vehicle bed 12 and/or to move dock leveler 10 between a stored position (FIGS. 1 and 4) and various operating positions, a rear hinge 28 allows deck 14 to pivot about a pivotal axis 30. Deck 14 can pivot between a range of positions including, but not limited to, a raised position (FIGS. 2, 5 and 7), a cross-traffic position (FIGS. 1 and 4), and a lowered position (FIGS. 3, 6 and 8). The pivotal motion is driven by any suitable means, examples of which include, but are not limited to, a hydraulic cylinder, a pneumatic cylinder, a fluid powered bladder, a motor driven linear actuator, a mechanical spring, a pneumatic spring, a winch, manual force, and/or various combinations thereof.

Figure 7:
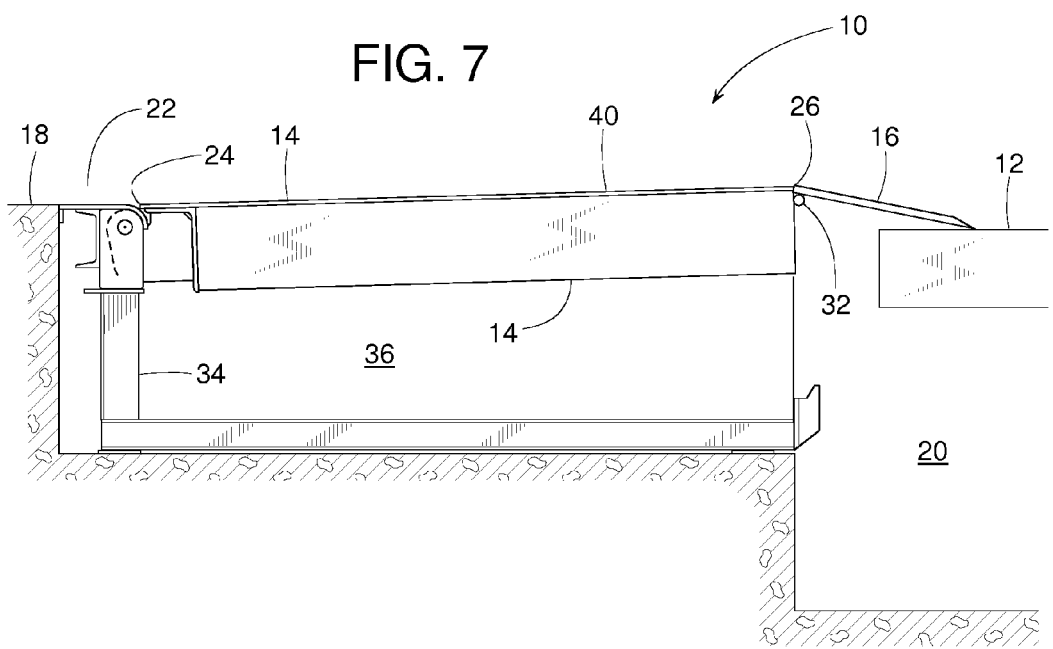
FIG. 7 is a side view of the dock leveler of FIGS. 1-6 showing the deck in a slightly raised position with the lip engaging the bed of a vehicle.
Figure 8:
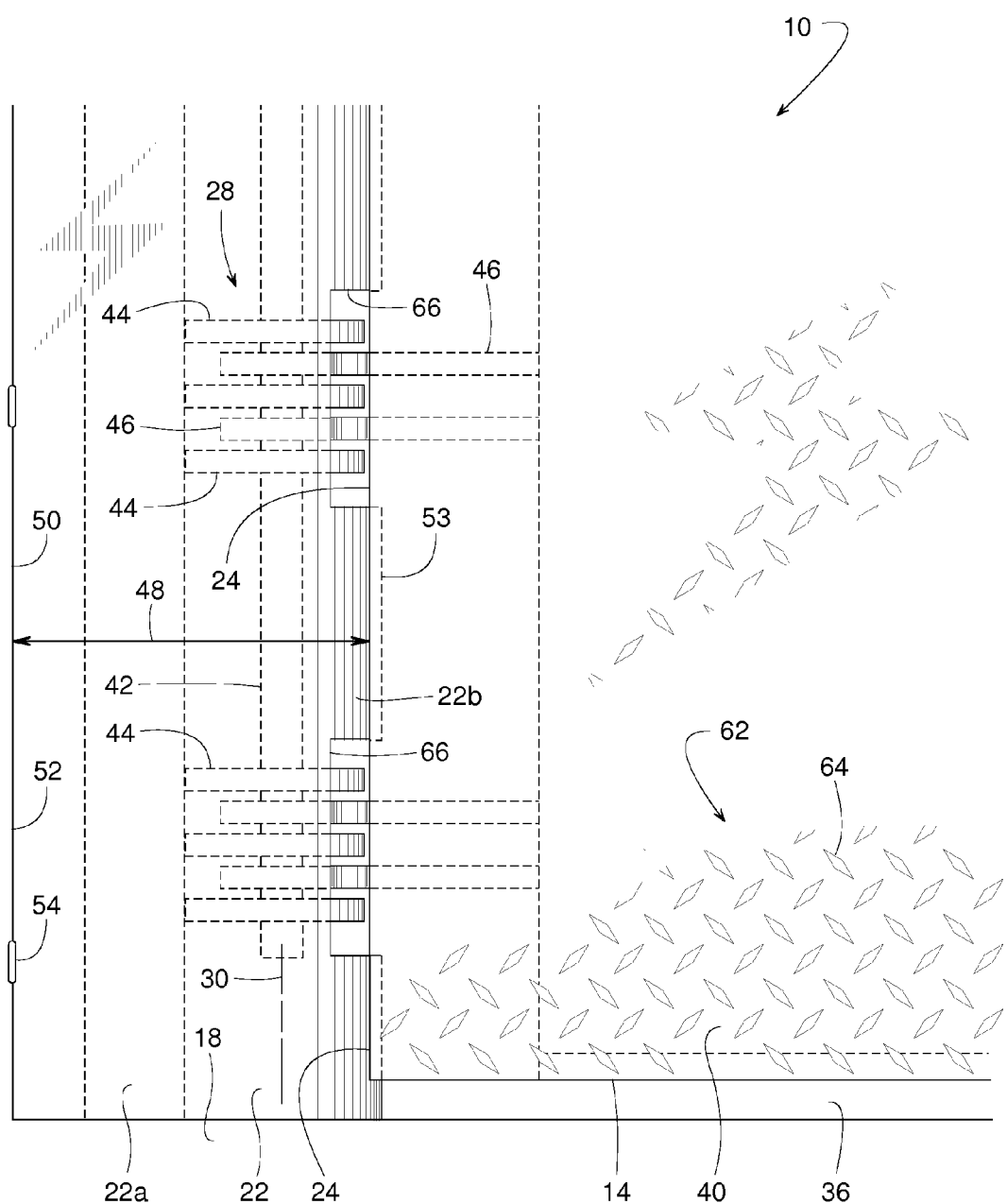
FIG. 8 is a top view of FIG. 3.

When deployed as shown in the example of FIG. 7, deck 14 is in a slightly raised position with lip 16 extended and resting upon vehicle bed 12. Although the illustrated example shows lip 16 being extendible by virtue of a hinge 32 that pivotally connects lip 16 to the deck's front edge 26, other example dock levelers include a lip that extends and retracts in translation relative to the deck. Pivoting or translation of various example lips is driven by any suitable means, examples of which include, but are not limited to, a hydraulic cylinder, a pneumatic cylinder, a fluid powered bladder, a motor driven linear actuator, a mechanical spring, a pneumatic spring, a winch, manual force, linkage between deck 14 and lip 16, and/or various combinations thereof.

In the illustrated example, dock leveler 10 includes a frame 34 installed within a pit 36. In some installations, a shim pack 38 is placed underneath frame 34 such that when deck 14 is in the cross-traffic position (FIGS. 1 and 4), a top surface 40 of deck 14 is generally horizontal and/or flush with platform 18. Referring to FIGS. 1 and 8, a hinge pin 42 of rear hinge 28 pivotally couples a plurality of frame lugs 44 of frame 34 to a plurality of deck lugs 46 of deck 14, thereby rendering deck 14 pivotal about axis 30.

To provide a smooth traffic surface over and/or adjacent to lugs 44 and 46, transition plate 22 fully spans a horizontal distance 48 between a rear wall 50 of pit 36 and the deck's rear edge 24. To provide such full coverage, transition plate 22 comprises a planar portion 22a and a curved portion 22b that span the distance 48. Planar portion 22a is adjacent to an upper edge 52 of rear wall 50, and curved portion 22b extends underneath rear edge 24 of deck 14 such that axis 30 is between rear wall 50 and a lower edge 53 of curved portion 22b. Planar portion 22a is substantially coplanar with platform 18 and surface 40 when deck 14 is in the cross-traffic position. In some examples, a tack weld joint 54 connects planar portion 22a to the pit's upper edge 52 and edge 52 includes a structural angle 56 with an anchor 58 embedded within the concrete of platform 18. In some examples, transition plate 22 is a unitary piece with portions 22a and 22b being integral extensions of each other to provide a preferably smooth seamless transition between portions 22a and 22b.

Having transition plate 22 extend fully and/or continuously from the pit's edge 52 to beyond the deck's rear edge 24 not only reduces and/or minimizes joints adjacent the rear edge 24 of the deck 14, but also allows the deck's top surface 40 to extend substantially seamlessly from the deck's front edge 26 to the rear edge 24. Also, transition plate 22 being mounted in a fixed, stationary location provides additional benefits that can be appreciated when the adjacent deck 14 moves or rises to the raised position of FIGS. 2 and 5.

As deck 14 rises from the position of FIG. 1 to that of FIG. 2, not only does the deck's front edge 26 rise, but rear edge 24 also rises. As rear edge 24 rises, any debris or obstruction at a gap 60 between plate 22 and deck 14 would tend to be lifted up and away by the upward movement of the deck's rear edge 24, rather than being pulled down into gap 60. Moreover, if melting snow or other moisture is on the top surface 40 as deck 14 rises to the position of FIGS. 2 and 5, rear edge 24 extending above transition plate 22 tends to direct the moisture onto the top of transition plate 22 where the moisture can readily be removed (e.g., mopped or swept away). In contrast, if the deck's rear edge 24 were below the transition plate, dirt-laden water on deck 14 would tend to drain down through gap 60 and accumulate in pit 36 where removal or cleaning can be difficult.

Yet another benefit provided by the transition plate 22 of the illustrated example pertains to traction between the deck 16 and the wheels of material handling equipment. For greater traction, the deck's top surface 40 preferably is textured with an embossed pattern 62 commonly known as "diamond plate," which is a herringbone pattern of raised rhombi 64. During manufacturing, however, it may be difficult to bend the diamond plate into curved shapes by brake tooling (although it can be done), as the embossed pattern can interfere with the forming operation. So if a curved transition plate were attached directly to deck 14, forming the curved plate would be easier if the plate is smooth. A smooth transition plate, however, provides less traction, and traction in the area of the transition plate is particularly important if the plate pivots with the deck. Moreover, if curved portion 22b were an integral extension of a deck with a diamond plate top surface, the embossed rhombi 64 on the curved surface would make it difficult to maintain an even radial hinge gap (gap 60) at the curved surface. With the illustrated example, the deck's entire top surface 40 is comprised of a unitary piece of diamond plate that provides a seamless span 64 (FIG. 4) from front edge 26 to rear edge 24.

During manufacturing and/or installation, transition plate 22 being designed for stationary mounting at a fixed location makes handling plate 22 easier and less awkward than if it were attached to a large pivotal deck, which can be quite cumbersome. In some installation examples, transition plate 22 is attached to structural angle 56 at pit edge 52 and frame 34 after frame 34 is installed within pit 36. Deck 14 would then be hung or coupled to the installed structure of frame 34, transition plate 22, and structural angle 56, which can make the dock leveler 10 easier to install.

In the illustrated example, axis 30 of rear hinge 28 is co-axial with the center of curvature for curved portion 22b. This ensures gap distance 60 between edge 24 and curved portion 22b remains substantially constant as deck 14 pivots about axis 30. In other examples, the axis 30 of the rear hinge 28 may be eccentric relative to a center of curvature of the curved portion 22b.

In some examples, transition plate 22 includes notches 66 (FIG. 8) that provide deck lugs 46 with additional clearance for allowing deck 14 to pivot upward and/or to facilitate the assembly of dock leveler 10. In some examples, notches 66 provide clearance for receiving deck lugs 46. In other examples, the notches are sized to provide clearance for both frame lugs 44 and deck lugs 46. The axial clearances illustrated in FIG. 8 are exaggerated to show more clearly how transition plate 22 and lugs 44 and 46 fit together.

Some of the aforementioned examples may include one or more features and/or benefits including, but not limited to, the following:

Some example dock levelers include a curved transition plate slightly spaced apart from a pivotal deck's top surface, wherein both the transition plate and the top surface are separate unitary pieces, and the deck's top surface is a diamond plate that runs seamlessly from a front to rear edge of the deck.

Some example dock levelers include a curved transition plate that extends underneath the rear edge of a pivotal deck.

Some example dock levelers include a pivotal deck with a front edge and a rear edge that both rise as the deck pivots upward to a raised position.

Some example dock levelers include a curved transition plate that can be attached after a frame of the dock leveler is installed within a pit.

Some example dock levelers include a pivotal deck with a rear edge that can move or push debris and/or other obstructions up and away from a hinge gap.

Some example dock levelers include a pivotal deck with a rear edge that moves up and over the top of a curved transition plate as the deck rises, whereby water runoff from atop the inclined deck tends to drain onto the transition plate rather than down through a hinge gap that leads to a relatively inaccessible area beneath the deck.

Some example dock levelers include a transition plate that is structured for stationary mounting at a fixed location, which makes handling of the plate easier and less awkward than if the plate were attached directly to a large cumbersome deck.

Although certain example methods, apparatus and articles of manufacture have been described herein, the scope of the coverage of this patent is not limited thereto. On the contrary, this patent covers all methods, apparatus and articles of manufacture fairly falling within the scope of the appended claims either literally or under the doctrine of equivalents.

The invention claimed is:

1. A dock leveler comprising:
a deck having a unitary seamless, relatively planar, top surface defining a front edge and a rear edge of the deck, the deck to pivot about an axis between a raised position where the front edge of the deck is higher than the rear edge, a cross-traffic position where the top surface of the deck is substantially horizontal, and a lowered position where the front edge is lower than the rear edge; and
a stationary transition plate having a planar portion and a curved portion extending therefrom, at least a portion of the curved portion to extend underneath the rear edge of the deck when the deck is in the cross-traffic position to enable the rear edge of the deck to move over the curved portion and extend above the planar portion when the deck is in the raised position to direct moisture on top of the deck toward the transition plate and away from a gap formed between the curved portion and the rear edge of the deck.

2. The dock leveler of claim 1, wherein the stationary transition plate defines a plurality of notches, and the dock leveler further comprises a plurality of deck lugs extending from the deck and protruding into the plurality of notches when the deck is in the raised position.

3. The dock leveler of claim 1, wherein the rear edge of the deck and the curved portion of the substantially stationary transition plate are spaced apart by a distance defined by the gap, the gap distance being substantially constant as the deck pivots.

4. The dock leveler of claim 1, wherein the axis is a center of curvature for the curved portion of the substantially stationary transition plate.

5. The dock leveler of claim 1, wherein the rear edge is higher when the deck is in the raised position than when the deck is in the lowered position.

6. The dock leveler of claim 1, wherein the stationary transition plate is a unitary piece providing a substantially seamless transition between the planar portion and the curved portion, and the top surface of the deck is a unitary plate providing a substantially seamless span between the front edge and the rear edge.

7. The dock leveler of claim 1, wherein the planar portion is substantially coplanar with the top surface of the deck when the deck is in the cross-traffic position.

8. The dock leveler of claim 1, wherein the rear edge of the deck and the curved portion are configured to enable the gap to maintain a uniform radial hinge distance between the curved portion and the rear edge as the deck pivots between the raised position and the lowered position.

9. The deck leveler of claim 1, wherein the rear edge of the deck is to cover the curved portion when the deck is in the raised position to provide a direct vehicle path between the planar portion and the rear edge of the deck.

10. The dock leveler of claim 1, wherein the deck surface is formed from a textured surface having an embossed pattern such that the textured surface at the rear edge of the deck transitions to the planar portion of the transition plate when the deck is in the raised position to provide a consistent traction area over the planar portion and the rear edge of the deck.

11. The dock leveler of claim 10, wherein the textured surface comprises a diamond plate coupled to the surface of the deck.

12. The dock leveler of claim 11, wherein the diamond plate comprises a herringbone pattern of raised rhombi.

13. A dock leveler installable within a pit adjacent a platform of a loading dock, the pit having a rear wall, the dock leveler comprising:
a frame installable within the pit, the frame having a frame lug that includes a first curved profile;
a deck having a deck lug extending underneath a deck plate of the deck and coupled to the frame lug via a hinge pin without use of a header, the deck lug having a second curved profile, the deck to pivot about an axis provided by the hinge pin between at least a raised position where a front edge of the deck is higher than a rear edge, a cross-traffic position where a top surface of the deck is substantially flush with the platform, and a lowered position where the front edge is lower than the rear edge; and
a transition plate attachable to the frame and being substantially stationary relative thereto, the transition plate having a planar portion and a curved portion extending therefrom, the planar portion being substantially coplanar with the top surface of the deck when the deck is in the cross-traffic position, wherein a periphery of the second curved profile of the deck lug is configured to substantially coincide with a periphery of the first curved profile of the frame lug to reduce a clearance needed between the curved portion and the frame.

14. The dock leveler of claim 13, wherein a rear edge of the deck and the rear wall of the pit define a horizontal spaced distance therebetween when the deck is in the cross-traffic position, the transition plate completely overlapping the horizontal spaced distance with the axis being underneath at least the planar portion of the transition plate.

15. The dock leveler of claim 13, wherein the curved portion has a lower edge positioned such that when the deck is in the cross-traffic position, the axis is horizontally between the rear wall of the pit and the lower edge of the curved portion.

16. The dock leveler of claim 13, wherein the transition plate defines a notch to receive the deck lug when the deck is in the raised position.

17. The dock leveler of claim 13, wherein a rear edge of the deck and the curved portion of the transition plate are spaced apart by a distance defined by the gap, the gap distance being substantially constant as the deck pivots.

18. The dock leveler of claim 13, wherein the axis is a center of curvature for the curved portion of the transition plate.

19. The dock leveler of claim 13, wherein a rear edge of the deck is higher when the deck is in the raised position than when the deck is in the lowered position.

20. The dock leveler of claim 13, wherein the hinge pin couples the rear edge of the deck to the frame to render the front edge of the deck vertically adjustable as the rear edge of the deck pivots about the pivotal axis.

21. The dock leveler of claim 20, wherein the rear edge of the deck and the rear wall of the pit define a horizontal spaced distance therebetween when the deck is in the cross-traffic position, the transition plate completely overlaps the horizontal spaced distance with the hinge pin being underneath the transition plate.

22. The dock leveler of claim 20, wherein the deck lug comprises a plurality of deck lugs extending from the deck and being connected to the hinge pin, wherein the curved portion of the transition plate defines a plurality of notches into which the plurality of deck lugs extend when the deck is in the raised position.

23. The dock leveler of claim 13, wherein the curved portion of the transition plate is positioned under the rear edge of the deck when the deck is in the raised position such that the top surface at the rear edge of the deck transitions to the planar portion of the transition plate when the deck is in the raised position to provide a consistent traction area over the planar portion and the rear edge of the deck.

24. The dock leveler of claim 13, wherein at least a portion of the curved portion is to extend underneath the rear edge of the deck when the deck is in the cross-traffic position to enable the rear edge of the deck to travel over the curved portion and extend above the planar portion when the deck is in the raised position to direct moisture on top of the deck toward the transition plate and away from a gap formed between the curved portion and the rear edge of the deck.

* * * * *